No. 843,336.
PATENTED FEB. 5, 1907.
H. W. GARLAND.
SAW GUIDE.
APPLICATION FILED MAR. 22, 1906.
2 SHEETS—SHEET 1.
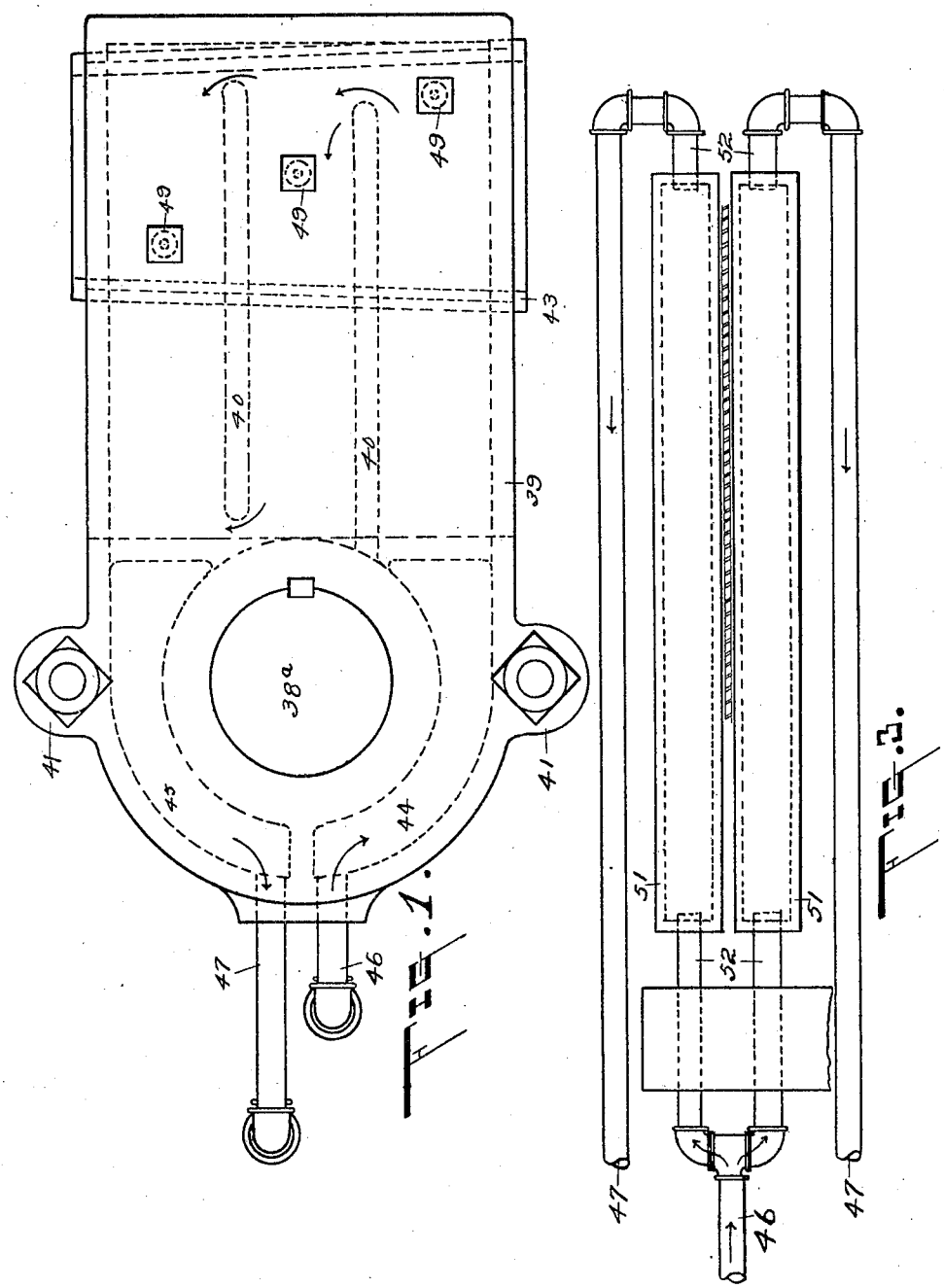
WITNESSES:
Roy Wallis.
L. H. Marshall.
INVENTOR
Harrison W. Garland.
BY
Geo. B. Willcox ATTORNEY No. 843,336. PATENTED FEB. 5, 1907.
H. W. GARLAND.
SAW GUIDE.
APPLICATION FILED MAR. 22, 1906.
2 SHEETS—SHEET 2.
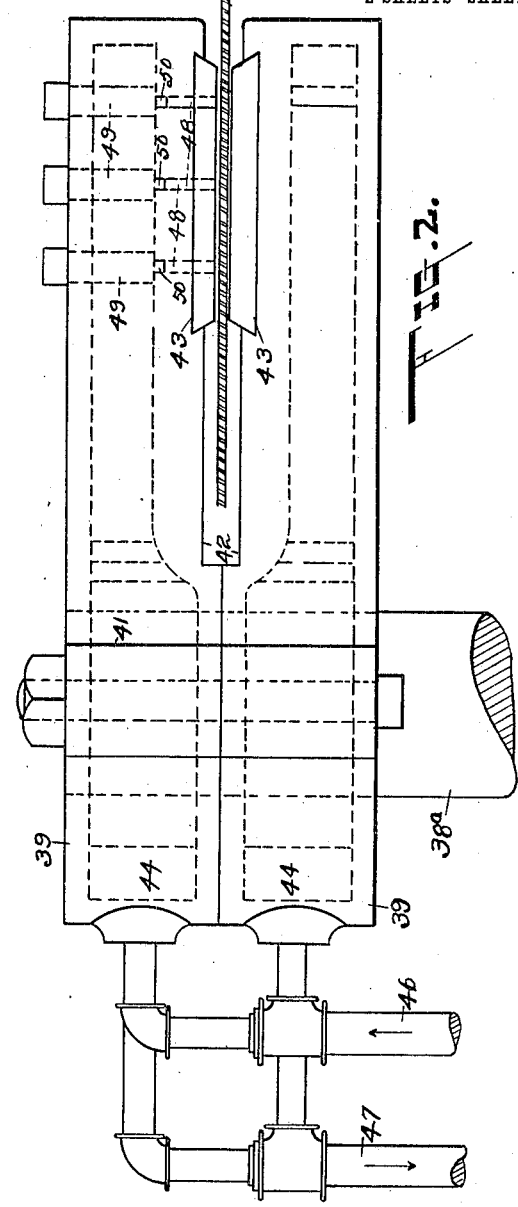
WITNESSES:
INVENTOR
Harrison W. Garland.
BY
Geo. B. Willcox
ATTORNEY

UNITED STATES PATENT OFFICE.

HARRISON W. GARLAND, OF BAY CITY, MICHIGAN, ASSIGNOR TO M. GARLAND CO., OF BAY CITY, MICHIGAN.

SAW-GUIDE.

No. 843,336.  Specification of Letters Patent.  Patented Feb. 5, 1907.

Application filed March 22, 1906. Serial No. 307,450.

*To all whom it may concern:*

Be it known that I, HARRISON W. GARLAND, a citizen of the United States, residing at Bay City, in the county of Bay and State of Michigan, have invented certain new and useful Improvements in Saw-Guides; and I do hereby declare the following to be a full, clear, and exact description of the invention, such as will enable others skilled in the art to which it appertains to make and use the same.

My invention relates to saw-guides, one object of which is the provision of a device or preventing the sagging of a band-saw.

Hitherto it has been inadvisable to provide a machine having a long band-saw of large capacity for the reason that the saw would sag intermediate its supports and make bad lumber unless guides were provided, and the forms of guides with which I am familiar tend to heat up the saw, owing to the high speed at which the latter travels, thus causing an infinite amount of trouble, and such have not been very successful.

My object is to provide a machine capable of operating a long saw, the saw to be guided and supported intermediate the wheels.

A further object is the provision of means for cooling the saw, such means in the present embodiment of my invention taking the form of hollow guides, through which circulates a cooling medium.

To these ends therefore my invention consists in certain novel features and combinations of parts, together with their equivalents, such as will be more fully disclosed hereinafter and particularly set forth in the claims.

In the accompanying drawings, illustrating one of the many embodiments of my invention, Figure 1 is an enlarged top plan view of one of the guides. Fig. 2 is a side view of the same, and Fig. 3 is a side view of a slightly-modified form of guide.

This invention is adapted for use in those horizontal band-sawing machines equipped with long band-saws and capable of operating upon a plurality of boards or lumber simultaneously presented at two different points in the length of the saw; but the invention is by no means restricted in its use to such machines, as it is capable of use with any band-saw machine with which I am familiar.

Obviously the saw will sag or bend without support between the band-wheels and further, by reason of the simultaneous presentation thereto of a plurality of boards, the friction would quickly heat the saw and ruin it, to prevent all of which I have devised a means for supporting and cooling the saw, one embodiment of which consists in the provision of suitable standards conveniently reduced at their upper ends, as at $38^a$. Guide-blocks 39 39, apertured near one end, are keyed or otherwise secured to the reduced upper ends of the standards, said guide-blocks each being hollow and provided with interspaced ribs 40 40, the blocks adapted to receive a cooling medium which is caused to take a circulatory course through the blocks by reason of the ribs 40 40. Each block is preferably rectilinear in contour and is provided near its rear end with apertured lugs 41 41 for receiving bolts, whereby the blocks are secured together in pairs, portions of their abutting faces being recessed, as at 42 42, forwardly of the reduced portions $38^a$ to receive the saw, and preferably the recessed walls are babbitted at that point where they engage the saw, as shown at 43 43. The rear ends of each block are channeled, as at 44 45, the channels terminating in orifices in which are fixed the ends of supply and discharge pipes 46 and 47, the supply-pipes leading from any suitable pressure source while the discharge-pipes receive the cooling medium, as water or other liquid, after it has completed its circulatory course through the block. In this manner the blocks are always kept at a reduced temperature, which is transmitted or communicated to the saw to prevent overheating. It is sometimes true that the temperature of the saw, in spite of the cooled guides, will become too great, in view of which it is desirable to bring the cooling medium directly in contact therewith. As one means for accomplishing this I preferably form small perforations 48 48 through the babbitting and through the bottom of the upper blocks, which perforations are normally closed by a series of plugs 49 49, having tapering points 50 50 received in the perforations, the plugs extending through the top of the upper block, in which they have a snug fit or through which they are threaded. Thus when it is desirable the plugs 49 49 are raised to allow the cooling liquid to pass through the perforations and contact directly with the saw. Preferably the plugs are not entirely removed from the blocks, but simply raised sufficiently to permit the access of the cooling medium to the perforations. The above constitutes the preferred form of this portion of my invention, but in Fig. 3 I have illustrated a slight modification wherein I have substituted rolls 51 51 in place of the blocks, the rolls being rotatably mounted on hollow shafts 52 52, the rolls spaced apart from each other to receive the saw therebetween. The supply-pipes 46 46 are connected to one end of each of the hollow shafts and the discharge-pipes 47 47 communicate with the opposite ends of said shafts, whereby a continuous circulation of a cooling medium is obtained through the rolls.

Having thus fully disclosed my invention, what I claim as new is—

1. A guide for a band-saw comprising a pair of suitably-supported hollow members, and inlet and outlet pipes connected to the members and communicating with the hollow interiors thereof to supply a circulating cooling medium thereto.

2. A guide for band-saws comprising a pair of members lying in a vertical plane, a band-saw received therebetween and means for maintaining a circulation of a cooling medium through the members.

3. A guide for band-saws comprising a pair of hollow blocks having inlet and outlet channels, ribs located within the blocks to cause a circulation therein of a cooling medium, inlet and outlet pipes communicating with the inlet and outlet channels to supply the cooling medium to the blocks and convey it therefrom and a cutter passing between the blocks.

4. A guide and support for band-saws or other cutter comprising a hollow member in contact with the cutter and means for effecting the circulation of a cooling medium therethrough.

5. A guide and support for traveling cutters comprising a hollow block, means for maintaining the circulation of a cooling medium therethrough, and means for permitting the cooling medium to have direct contact with the cutter.

6. A guide and support for traveling cutters, comprising a hollow block, means for maintaining the circulation of a cooling medium therethrough, the block having a series of apertures therein to permit access of the cooling medium directly to the cutter and plugs for removably closing the apertures.

7. A guide and support for traveling cutters comprising a pair of hollow blocks located adjacent each other, the adjacent surfaces of the blocks being recessed, a traveling member received in the space formed by the recesses, means for maintaining the circulation of a cooling medium through the blocks, one of said blocks being perforated to permit the cooling medium to have direct contact with the traveling member and removable plugs for closing the perforations.

In testimony whereof I affix my signature in presence of two witnesses.

HARRISON W. GARLAND.

Witnesses:
 JAS. E. DUFFY,
 EDITH BOUNIN.